United States Patent
Kvaalen et al.

(10) Patent No.: US 10,037,335 B1
(45) Date of Patent: *Jul. 31, 2018

(54) DETECTION OF 3-D VIDEOS (71) Applicant: Google Inc., Mountain View, CA (US)

(72) Inventors: Samuel Kvaalen, San Francisco, CA (US); Jonathan Huang, Santa Clara, CA (US); Peter Bradshaw, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 269 days.

This patent is subject to a terminal disclaimer.

(21) Appl. No.: 14/791,168

(22) Filed: Jul. 2, 2015

Related U.S. Application Data (63) Continuation of application No. 13/367,683, filed on Feb. 7, 2012, now Pat. No. 9,106,894.

(51) Int. Cl.
H04N 13/00 (2018.01)
G06F 17/30 (2006.01)

(52) U.S. Cl.
CPC .. *G06F 17/30153* (2013.01); *G06F 17/30106* (2013.01); *G06F 17/30784* (2013.01)

(58) Field of Classification Search
None
See application file for complete search history.

(56) References Cited

U.S. PATENT DOCUMENTS

| | | | |
|---|---|---|---|
| 2002/0054705 A1* | 5/2002 | McCormick | H04N 13/0225 382/154 |
| 2005/0030301 A1 | 2/2005 | Harrold et al. | |
| 2007/0222855 A1 | 9/2007 | Krijn et al. | |
| 2010/0053306 A1 | 3/2010 | Hirasawa et al. | |
| 2010/0303442 A1* | 12/2010 | Newton | H04N 13/0033 386/241 |
| 2011/0038614 A1* | 2/2011 | Chen | G11B 27/322 386/341 |
| 2011/0176616 A1* | 7/2011 | Luthra | H04N 13/0048 375/240.16 |

(Continued)

FOREIGN PATENT DOCUMENTS

WO WO 2011040414 4/2011

*Primary Examiner* — Anand S Rao
*Assistant Examiner* — Samuel D Fereja
(74) *Attorney, Agent, or Firm* — Young Basile Hanlon & MacFarlane, P.C.

(57) ABSTRACT

Methods and systems related to the detection of 3-D video content are disclosed herein. Specifically, a video image file may be analyzed in order to determine if it contains 3-D stereoscopic video content. An assumption is made regarding the possible 3-D format of the video image file. The assumption could be that the video frame includes a left portion and a right portion where each portion contains respective stereoscopic image perspectives. Image analysis algorithms could be used to determine if the left and right portions are sufficiently similar to confirm the assumption. If so, an indication could be carried out that could include a change to metadata or a similar change to associated video image file information. If the left and right portions of the video frame are not sufficiently similar, another analysis may be performed to test a different 3-D file format assumption.

17 Claims, 6 Drawing Sheets (56) References Cited

U.S. PATENT DOCUMENTS

| | | | |
|---|---|---|---|
| 2011/0280300 A1* | 11/2011 | Tourapis | H04N 13/0048 |
| | | | 375/240.2 |
| 2012/0002022 A1* | 1/2012 | Ohgose | H04N 9/8227 |
| | | | 348/51 |
| 2012/0019617 A1* | 1/2012 | Ahn | H04N 13/0048 |
| | | | 348/43 |
| 2012/0033039 A1 | 2/2012 | Sasaki et al. | |
| 2012/0081515 A1* | 4/2012 | Jang | H04N 5/45 |
| | | | 348/43 |
| 2012/0106921 A1 | 5/2012 | Sasaki et al. | |
| 2012/0127279 A1 | 5/2012 | Kochi et al. | |
| 2012/0183277 A1 | 7/2012 | Tajima et al. | |
| 2013/0007833 A1* | 1/2013 | Kitazato | H04N 13/0066 |
| | | | 725/116 |
| 2013/0242051 A1* | 9/2013 | Balogh | H04N 19/00769 |
| | | | 348/43 |

* cited by examiner

DETECTION OF 3-D VIDEOS

CROSS REFERENCE TO RELATED APPLICATION

This application is a continuation of U.S. application Ser. No. 13/367,683, filed Feb. 7, 2012, which is incorporated by reference in its entirety.

FIELD

This disclosure relates generally to 3D images and videos, and more particularly to detecting stereoscopic 3D images and videos.

BACKGROUND

To create a stereoscopic 3-D image, two 2-D images of a scene are captured at two different locations. In a conventional approach, the two different locations correspond to the locations of two different lenses, which could be on either the same camera or on two different cameras. Although stereoscopy was originally applied to still images, a succession of stereoscopic image pairs from two different 2-D cameras can be combined to form 3-D video content. For example, the captured 2-D images can be converted using various 3-D formats and presented to a viewer as a single pseudo-3-D image. This combined 3-D image can be viewed with hardware generally configured to provide a different 2-D perspective to each eye. When viewed properly, the pseudo-3-D image may allow the user to experience an illusion of depth in the image.

With the increasing amount of 3-D content available on the internet and to the average user today, efficient recognition and classification of such content is becoming increasingly valuable. Thus, there is a need to provide methods and systems that enable the automatic detection of 3-D content.

SUMMARY

In a first aspect, a method for determining whether an image file contains three-dimensional content is provided. The method includes performing a first analysis of an image file to determine whether the image file contains three-dimensional content in a side-by-side format. The first analysis includes in a first step, for an individual image frame in the image file, comparing a left side of the image frame with a right side of the image frame to determine a similarity value. The first analysis further includes in a second step, classifying the image frame as stereoscopic if the similarity value indicates that the left and the right sides of the image frame correspond to different perspectives of a common scene. The second step of the first analysis further includes classifying the image frame as non-stereoscopic if the similarity value indicates that the left and the right sides of the image frame do not correspond to different perspectives of a common scene. The first analysis further includes repeating the first two steps to obtain N classifications of N image frames in the image file, where N>1. The first analysis further includes determining an outcome based on the N classifications of the N image frames. The outcome indicates whether the image file contains three-dimensional content in the side-by-side format. If the first analysis indicates that the image file contains three-dimensional content in the side-by-side format, an indication that the image file contains three-dimensional content is provided. If the first analysis indicates that the image file does not contain three-dimensional content in the side-by-side format, at least one additional analysis of the image file could optionally be performed to determine whether the image file contains three-dimensional content in at least one other format.

In a second aspect, a computing device is provided. The computing device includes a processor and data storage. The data storage is configured to store program instructions. The program instructions are configured to, upon execution by the processor, cause the computing device to perform functions. The functions include receiving an image file and performing a first analysis of the image file to determine whether the image file contains three-dimensional content in a side-by-side format. The first analysis includes in a first step, for an individual image frame in the image file, comparing a left side of the image frame to a right side of the image frame to determine a similarity value. The first analysis further includes in a second step, classifying the image frame as stereoscopic if the similarity value indicates that the left and the right sides of the image correspond to different perspectives of a common scene. The second step of the first analysis further includes classifying the image frame as non-stereoscopic if the similarity value indicates that the left and the right sides of the image frame do not correspond to different perspectives of a common scene. The first analysis further includes repeating the first two steps to obtain N classifications of N image frames in the image file, where N>1. The first analysis further includes determining an outcome of the first analysis based on the N classifications of the N image frames. The outcome indicates whether the image file contains three-dimensional content in the side-by-side format. The functions further include, if the first analysis indicates that the image file contains three-dimensional content in the side-by-side format, providing an indication that the image file contains three-dimensional content. In some implementations, if the first analysis indicates that the image file does not contain three-dimensional content in the side-by-side format, the functions may further include performing at least one additional analysis of the image file to determine whether the image file contains three-dimensional content in at least one other format.

In a third aspect, a non-transitory computer readable medium is provided. The non-transitory computer readable medium has stored therein instructions that are executable by a computing device to cause the computing device to perform functions. The functions include performing a first analysis of the image file to determine whether the image file contains three-dimensional content in a first format. The first format includes at least one of a side-by-side format, a top-bottom format or an interleaved format. The first analysis includes in a first step, for an individual image frame in the image file, determining a similarity value. The first analysis further includes in a second step, classifying the image frame as stereoscopic if the similarity value indicates that the image frame contains images that correspond to different perspectives of a common scene. The second step of the first analysis further includes classifying the image frame as non-stereoscopic if the similarity value indicates that the image frame does not contain images that correspond to different perspectives of a common scene. The first analysis further includes repeating the first two steps to obtain N classifications of N image frames in the image file, where N>1. The first analysis further includes determining an outcome based on the N classifications of the N image frames. The outcome indicates whether the image file contains three-dimensional content in the first format. The functions further include, if the first analysis indicates that the image file contains three-dimensional content in the first format, providing an indication that the image file contains three-dimensional content. In some implementations, if the first analysis indicates that the image file does not contain three-dimensional content in the first format, the functions may further include performing at least one additional analysis of the image file to determine whether the image file contains three-dimensional content in at least one other format.

DETAILED DESCRIPTION

In the following detailed description, reference is made to the accompanying figures, which form a part thereof. In the figures, similar symbols typically identify similar components, unless context dictates otherwise. The illustrative embodiments described in the detailed description and figures are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

1. Overview

Three-dimensional (3-D) imaging records visual information in a scene with regard to all three dimensions of space. Such 3-D imaging may be used, for example, to provide the illusion of depth and/or to provide a full spatial map of an object or location. Standard two-dimensional (2-D) imaging techniques can provide similar depth cues in a single 2-D image, for instance by taking advantage of foreground/background elements, depth of field, focus point depth, and other known techniques in 2-D photography. However, 3-D images can provide further viewing realism and more complete data about the spatial content of a scene when compared to 2-D-only imaging.

Several techniques are possible to record 3-D images. One such technique is stereoscopy, where at least two different 2-D images, each with a different perspective of a scene, are combined to create a 3-D image that includes depth information.

Although stereoscopic imaging can provide a viewer with depth information about a scene, it may not necessarily provide a 'true' 3-D image of the scene and/or subject. That is, the combination of two 2-D images usually does not provide sufficient information to build a complete 3-D image of a scene and/or a subject. In many situations, stereoscopic imagery may be more accurately termed, 'pseudo 3-D imagery'. Accordingly, within the context of this description, references to '3-D imagery' and other similar terms should be understood as corresponding to references to 'pseudo-3-D stereoscopic imagery'.

The 2-D images used to form the combined 3-D image can be obtained in a variety of ways. For instance, two cameras could each capture single images from different positions or a single camera could be used to capture a first and a second image, each image from a different position. Alternatively, a stereo camera could be used to capture images of the scene using at least two image sensors and corresponding optics. The 2-D images can be captured simultaneously or in a successive fashion. Alternatively, the 2-D images can be captured with some time period between frames, for instance in a time-lapse situation. The context of this disclosure is described primarily with reference to 3-D video content, particularly those having streams of 3-D stereoscopic image frames. However, those familiar in the art will recognize that similar methods and devices could be used to with respect to 3-D still images and other types of stereoscopic or multiscopic 3-D video content.

3-D video content (or stereo 2-D image streams) can be captured with a stereo video camera, that is, a video camera with two lenses and two image sensors. The two image sensors may capture separate 2-D image streams that could be synchronized in time. Other 3-D video capture systems are possible. The video images may be captured at a fixed or variable video frame rate, which can be measured in units of frames per second (fps). The video capture frame rate may depend at least upon the particular camera device used. In one embodiment, the frame rate may be 24 fps.

Once the stereo 2-D video streams are captured, they can be combined in different ways in order to create a stream of stereoscopic 3-D image frames, which can be termed the 3-D video content. The combination (3-D image encoding) process could take place within the camera itself or in a separate computing device configured to combine raw video streams. Further, the stereo 2-D video streams could each be saved to recordable media for later 3-D video encoding.

3-D content could be compressed (encoded) and decompressed (decoded) using various methods including the Moving Picture Experts Group H.264/MPEG-4 AVC standard. Specifically, the content could be asymmetrically compressed with an algorithmic or adaptive encoder. Subsequently, the encoded bitstream can be decompressed with a decoder. Compliant decoders could include known combinations of hardware and software configured to decompress the encoded data. Video content that integrates multiple views (such as the stereoscopic 3-D content) can be encoded using multiview video coding (MVC) standards and methods. Other ways of encoding and decoding the 3-D content are possible and contemplated within the context of this disclosure, such as methods conforming to the proposed High Efficiency Video Coding (HEVC) standard.

In one example of 3-D video encoding, a red-cyan anaglyph, the first 2-D video stream could be a black and white image tinted with a red color. The second 2-D video stream could be similarly tinted with a cyan (blue) color. The tinted first and second image streams could be overlaid upon one another and viewed with red-cyan glasses (3-D glasses).

The filters on the red-cyan glasses cause one eye of the glasses-wearer to see substantially only the first image, while the other eye of the wearer can see substantially only the second image. In this manner, a stereoscopic 3-D video can be created from two shifted 2-D image streams in an effort to simulate a 3-D scene.

In another example of 3-D video encoding, the two captured 2-D image streams could be combined into a stereoscopic 3-D video stream by assigning the content of respective (and synchronized) 2-D frames to different spatial locations within each pseudo-3-D video frame. For instance, the 2-D image frame captured by the left camera could be assigned to the top portion of the full 3-D video frame and the corresponding 2-D image frame captured by the right camera could be assigned to the bottom portion of the 3-D video frame. In the example embodiment, a stereo multiplexer may be used to combine the stereo 2-D image streams into a 3-D image stream. Further, the 3-D video frame pixel extents could be configured such that each individual 3-D image frame includes information formatted to 1920 pixels wide by 2205 pixels high in a Top and Bottom (TaB) format. This particular uncompressed video formatting is termed a dual-stream synchronized video program. Other such frame-compatible formats known in the art include Side-by-Side (SbS) and interleaved formats.

Compressed formats are possible, for instance, that downsample pixel information in one or more dimensions. Specifically, in a compressed side-by-side video format, each video frame includes left and right image streams with full vertical resolution but half of the recorded horizontal resolution. Thus, each 2-D video stream may be compressed down to 960×1080 pixels within a standard 1920×1080 video frame.

After encoding into a 3-D video format, the image file may be stored in a memory for future viewing, for example. Additionally, the image file may be transmitted via wired or wireless means to another computer system, memory, or display device. The image file could be configured based on a variety of different standard file formats known in the art.

At the point of end use, the image file may be displayed. The image file and associated 3-D content could be viewed with various displays known and utilized in the art. For instance, high definition televisions (HDTVs) with pixel dimensions of 1920×1080 could be used. Further, the display could be configured to operate in an interlaced or a progressive scan mode. Other display types are possible. For example, 3-D content can be viewed on HDTVs using content delivered using various frame-compatible formats. Frame-sequential displays (also known as alternate frame displays) may deliver images to each eye of a viewer in sequence. In other words, using a set of synchronized active shutter glasses, a viewer may be able to see a video frame viewable with his or her right eye followed by a video frame viewable with his or her left eye. Typical frame rates for such frame-sequential displays can be around 120 Hz or higher.

Other methods for viewing pseudo-3-D video images on 3-D displays are possible and vary widely. Examples of 3-D content viewing methods include anachrome (red/cyan) glasses, linearly/circularly polarized glasses, and autostereoscopy, where different images may be presented to each eye of the viewer without the need for other headgear.

A method, apparatus and a set of functions that may be stored in a non-transitory computer readable medium are described herein. Specifically described is an efficient method and system for determining whether a video image file contains 3-D video content.

It will be evident to those skilled in the art that there are many ways to implement such a method and apparatus using a computing device. As such, the following example embodiments are not meant to preclude any such alternate implementations and embodiments, which are implicitly contemplated herein.

2. A Computing Device for 3-D Video Detection and Classification

Figure 1:
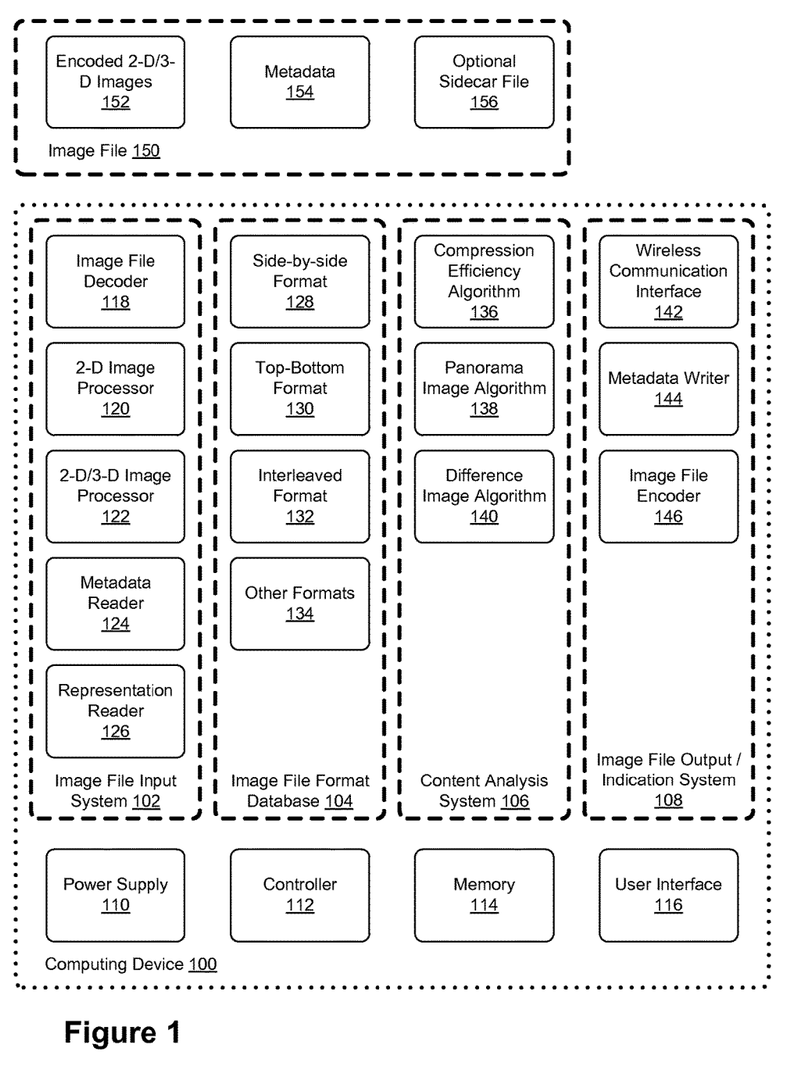
FIG. 1 is a schematic diagram of a computing device and a 3-D image file, in accordance with an example embodiment.

FIG. 1 is a schematic diagram of a computing device 100 that may include several different components and subsystems. In an example embodiment, device 100 could include subsystems such as an image file input system 102, an image file format database 104, a content analysis system 106, and an image file output/indication system 108, as well as a power supply 110, a controller 112, a memory 114, and a user interface 116.

The image file 150, which could be generally considered an input and an output of computing device 100, could include various components such as encoded 2-D/3-D images 152, metadata 154, and an associated optional sidecar file 156. The encoded 2-D/3-D images 152 could represent a stream of image frames that could include of one or more 2-D image components. For instance, 3-D stereoscopic image frames may include two 2-D images that offer slightly different perspectives of the same scene. Such image frames could make up a 3-D stereoscopic video file. Alternatively, a stream of image frames with one 2-D image in each image frame may be considered a 2-D video. Metadata 154 could be any data that represents information about the video content in the video image file. The sidecar file 156 could also provide information about the video content in the video image file, but could be an embedded file within the video image file or a separate file completely.

The image file input system 102 may include components such as an image file decoder 118, a 2-D image processor 120, a 2-D/3-D image processor 122, a metadata reader 124, and a representation reader 126. The image file format database 104 could be a data storage device that may store information based on a side-by-side format 128, a top-bottom format 130, an interleaved format 132, and other formats 134. The content analysis system 106 may include a compression efficiency algorithm 136, a panorama image algorithm 138, and a difference image algorithm 140. The image file output/indication system 108 could include a wireless communication interface 142, a metadata writer 144, and an image file encoder 146.

Computing device 100 could represent part of a still camera, a video camera, a cell phone, a web cam, a tablet device, or any other image capture device known in the art. Further, computing device 100 could be part of a wearable computing system and/or integrated into any number of computer systems known in the art. Computing device 100 could be a stand-alone device. Alternatively, computing device 100 could represent part of a distributed server system with its various subsystem components spread across one or more computing platforms and/or physical locations.

The power supply 110 may provide power to various components of computing device 100 and could represent, for example, a rechargeable lithium-ion battery. Other power supply materials and types known in the art are possible.

Many of the functions of computing device 100 could be controlled by the controller 112. The controller 112 may include one or more processors (such as microprocessors) that execute instructions stored in a non-transitory computer readable medium, such as the memory 114. The controller 112 could control the user interface 116 to accept commands from a user of computing device 100. The controller 112 could also control the components of the image file input system 102, image file format database 104, content analysis system 106, and the image file output/indication system 108. The controller 112 may also represent a plurality of computing devices that may serve to control individual components or subsystems of the device 100 in a distributed fashion.

In addition to instructions, the memory 114 may store data such as previously analyzed image frames and various image frame formats, such as the components of the image file format database 104. Thus, the memory 114 may function as a data store of information related to video image formats. Such information may be used by device 100 and controller 112 at various points during the analysis of video image frames.

The computing device 100 may include a user interface 116 for providing information to or receiving input from a user of computing device 100. By interacting with the user interface 116, a user of computing device 100 could control its operation and/or analysis format. Other options and functions related to the operation of computing device 100 could be controlled by a user through the user interface 116.

The image file input system 102 could include several components, including an image file decoder 118, a 2-D image processor 120, a 2-D/3-D image processor 122, a metadata reader 124, and a representation reader 126. The image file input system 102 could be configured to accept video image content and manipulate the corresponding image frames for similarity analysis.

The image file decoder 118 may include hardware and/or software, such as a video codec, configured to decode a video image file. The 2-D image processor 120 could be configured to manipulate 2-D image frames from the video image file. The 2-D/3-D image processor 122 could be configured to manipulate stereo pseudo-3-D image frames.

Further, the 2-D/3-D image processor 122 could process the 3-D image into a format intended for display on a standard 2-D display or on a display specifically configured to display 3-D image formats. For example, an anaglyph image transposition or a stereogram could be created from the plurality of 2-D images that may deliver a 3-D-like effect using a 2-D display. A variety of 3-D image formats are known in the art for the display of pseudo-3-D imagery and are all possible within the scope of this disclosure and contemplated herein.

The metadata reader 124 could be configured to read the metadata that may be embedded in a video image file. The metadata may include various information about the video image, including the pixel resolution, video duration, video type (e.g. 2-D, stereoscopic 3-D, multiscopic, etc.), and video format (e.g. single view area, top-and-bottom, side-by-side, 3×3, etc.). Further, the metadata reader 124 could represent hardware and/or software configured to read a separate file, such as a sidecar file, that may include information about the video image file.

In some cases, a video may be analyzed that may include an initial representation regarding the video content or particular 3-D format. For instance, when uploaded to a server, the video image file uploader may indicate that the video image file has a type and a frame format (e.g. stereoscopic 3-D with an uncompressed side-by-side format). In such cases, the representation reader 126 may determine the as-represented frame format for a video image file and may assume the frame format is as represented. Alternatively, a particular frame format could be assumed all the time (e.g. side-by-side) or selected randomly from a set of known frame formats, for instance that may be stored in image file format database 104.

The image file format database 104 could store information about how stereoscopic and multiscopic images may be arranged within an image frame of a video file. This information may provide computing device 100 with possible initial assumptions about the format of a video image file. For instance, the image file format database 104 could store the pixel area dimensions and locations of various stereoscopic 3-D image formats, such as side-by-side or top-and-bottom frame formats. The information could be stored using absolute pixel locations, or could be stored in terms of relative relationships. For example, for a side-by-side format, the image frame could be split in half along the horizontal direction of the frame, regardless of the image frame pixel resolution. Alternatively, pixel dimensions could be explicitly stored. Using an uncompressed side-by-side image format example, the left stereoscopic perspective could be assumed to be the left-most 1920×1080 array of pixels in the video image frame and the right stereoscopic perspective could be assumed to be the right-most 1920×1080 array of pixels in the video image frame. Those skilled in the art will understand that a variety of both relative and absolute pixel dimensions may be included in such an image file format database so as to provide reasonable initial assumptions about the format of a video image file in an effort to analyze the image file for 3-D content.

In practice, when a video image file is decoded by the image file input system 102, an initial format assumption may be produced by at least a combination of the image file format database 104, the controller 112, and the metadata reader 124. For instance, a video file could be decoded by image file decoder 118. The metadata in the video file could be read by metadata reader 124. If the metadata includes information regarding the 3-D stereoscopic nature of the video file or the stereoscopic format of the video file, metadata reader 124 could provide this information to the controller 112. Controller 112 could query the image file database 104 to obtain a likely pixel resolution and location of each 2-D stereoscopic image stream in the video file. Thus, upon acquiring an image file, individual video image frames may be separated into two or more comparison images based upon the format assumption used by controller 112. These comparison images may be used by the content analysis system 106 to determine whether 3-D image content exists in the video image file under consideration.

The computing device 100 may include a content analysis system 106 configured to provide a similarity value to the controller 112 based on various criteria, such as the similarity of two or more pixel areas within an individual frame of a video image file. The content analysis system 106 could include hardware and/or software configured to analyze video files and their corresponding image frames (and comparison images) to produce a similarity value based on a number of different possible analysis algorithms.

For instance, one possible analysis could be based on the compression ratio of the video image file itself. Specifically, those video image files with stereoscopic 3-D information may compress with a higher ratio than 2-D imagery with the same pixel dimensions. As such, a compression efficiency algorithm 136 could be used to determine if a video image file contains 3-D stereoscopic or multiscopic image content, and thus produce a similarity value. The compression method could be a general data compression method or a method specific to video frame compression (such as according to an MPEG compression standard). Compression ratios of 65% or better can indicate sufficient similarity to consider the video frame to be stereoscopic.

The compression efficiency analysis may change significantly depending upon the video codec used when the video file is compressed. For instance, the initial compression algorithm may take advantage of repeating image elements and/or symmetry in the video image. As such, if the video image content to be compressed includes stereoscopic views, that video image file may compress more efficiently than if using other compression algorithms. Thus, depending upon the compression algorithm, analysis based on compression efficiency may be particularly effective in developing an assumption about the 2-D or 3-D stereoscopic nature of the video file.

However, analysis to determine 3-D content in a video image file using compression ratios is generally a rough guide. For example, video frames that are relatively featureless (e.g. a video of a clear blue sky) will also compress well even if the content is not stereoscopic.

Other analysis algorithms include a panorama image algorithm 138 and a difference image algorithm 140. The panorama image algorithm may include an algorithm similar to those found in hardware and software to stitch multiple images for use in a panoramic image. Such an algorithm could, for example, try to overlay two or more comparison images derived from the original video image frame. The algorithm may attempt different offsets of the comparison images in an effort to create a seamless single image.

Assuming a correct initial format assumption for a video file containing stereoscopic 3-D video content, the panorama image algorithm 138 should be able to overlay the comparison images in a panoramic image since the two views are made of the same scene from only slightly different perspectives. Successful panoramic image creation may strongly indicate that the video image file contains stereoscopic 3-D video content using the assumed format. Thus a similarity value could be generated that is large to indicate that the two or more comparison images are very similar to one another.

If the panorama image algorithm 138 is unable to find an acceptable panoramic stitching solution, it could indicate that the video image file does not contain 3-D content arranged using the assumed frame format. As such, a similarity value could be generated that could be relatively low, indicating that the comparison images are very different from one another.

Additionally or alternatively, a difference image algorithm 140 could be used as a means to generate a similarity value upon analysis of a video image frame or frames. In such an algorithm, the two or more comparison images may be overlaid upon each other and subtracted from one another to create a difference image based on the relative value of the overlaid pixel luminance or other characteristics of each pixel pair, for instance color saturation or hue. The absolute value of these difference values can be analyzed to determine similarity between the two or more comparison images. For instance, assuming a side-by-side format, the luminance of a left 2-D perspective may be subtracted by the luminance of a right 2-D perspective. Since the two perspectives were captured with only slight differences, the remaining absolute value of the luminance values may be nearly zero. As such, a similarity value may be generated that could be high. Conversely, if the subtraction results in a set of values that are in general not near zero, the generated similarity value could be relatively low. Other analysis algorithms, including those image recognition and image comparison algorithms known in the art, could be used.

If the similarity value is determined to be below a predetermined threshold after any particular analysis, iteration between different format assumptions and analysis algorithms is possible. Similarity values could be determined for each frame of a video image file, alternatively similarity values may be determined from representative frames of a video image file. For example, it may be sufficient to test as few as 3 frames in a video, provided the frames are in different portions of the video. Existing algorithms for automatic selection of video thumbnails may provide an initial basis of representative frames.

The image file output/indication system 108 could be configured to notify another device about the video image type (e.g. 2-D, stereoscopic 3-D, multiscopic 3-D, etc) and frame format (e.g. side-by-side, top-and-bottom, interleaved, compressed, etc.). Additionally or alternatively, the image file output/indication system 108 could be configured to encode the video image type and frame format information into the metadata or a sidecar file associated with the video file. As such, the system may include a wireless communication interface 142 to deliver various indications, for example, to another computing device. For example, upon generation of a high similarity value, an indication may be provided to a computing device, which could be configured to store and/or display the video, that the analyzed video contains 3-D stereoscopic content in the uncompressed side-by-side format with an intended viewing resolution of 1920×1080. Alternatively, upon analysis using several different format assumptions and if a low similarity value was determined, an indication could be made to the server network or other appropriate resource stating that the analyzed video image file contains no 3-D image content (e.g. 2-D content only). Other information could be passed along by the indication system 108 including frame rate and active shutter sync signals, etc. The wireless communication interface 142 could be wired in alternate embodiments.

The image file output/indication system 108 may alternatively or additionally encode information about the video file into the metadata or into a sidecar file. The metadata writer 144 could be configured to adjust or create metadata for the analyzed video file. The image file encoder 146 could encode the video file into one of the aforementioned video image file formats, such as the H.264/MPEG-4 AVC standard. Thereafter, the video image file containing, for instance, updated metadata regarding the video file type and format, may be uploaded to a server network or other computing device.

Although FIG. 1 shows various components of computing device 100 (e.g. controller 112, memory 114, power supply 110, content analysis system 106, etc,) as being integrated into the computing device 100, one or more of these components could be mounted or associated separately from the computing device 100. For example, the content analysis system 106 could be mounted separately from the computing device 100, for instance in a distributed computing system. Thus, the computing device 100 could be provided in the form of device elements that may be located separately or together. The device elements that make up computing device 100 could be communicatively coupled together in a wired and/or wireless fashion.

Figure 2A:
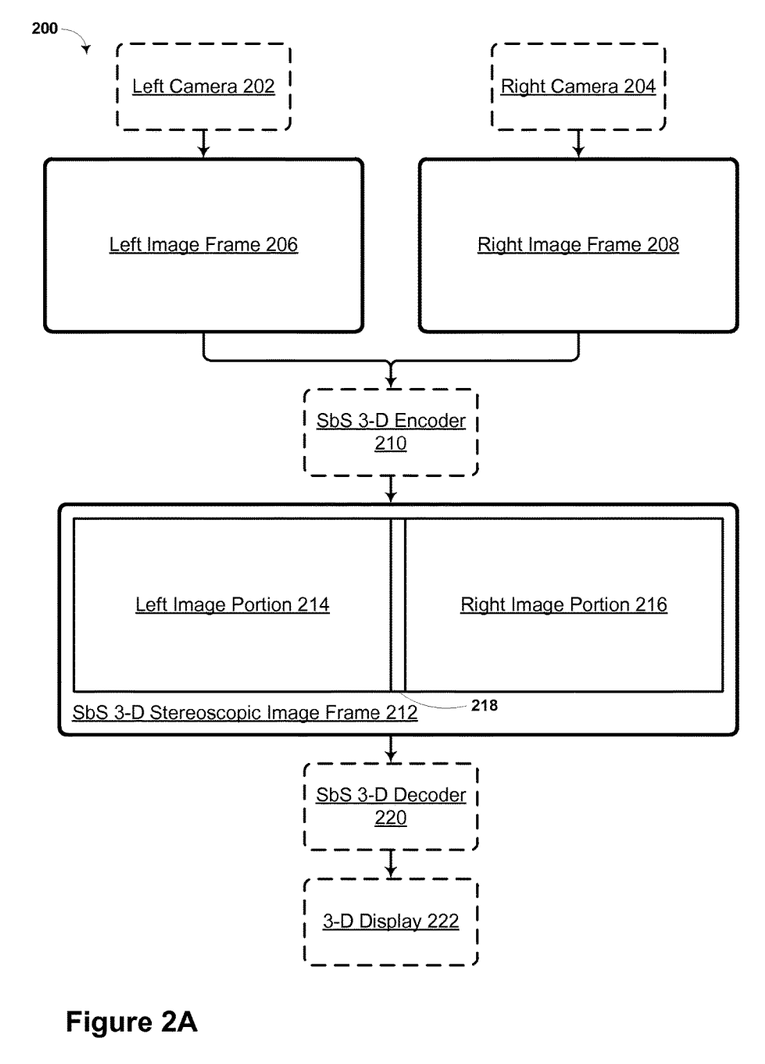
FIG. 2A illustrates the capture, encoding, decoding, and display of 3-D stereoscopic images encoded using a side-by-side file format, in accordance with an example embodiment.
Figure 2B:
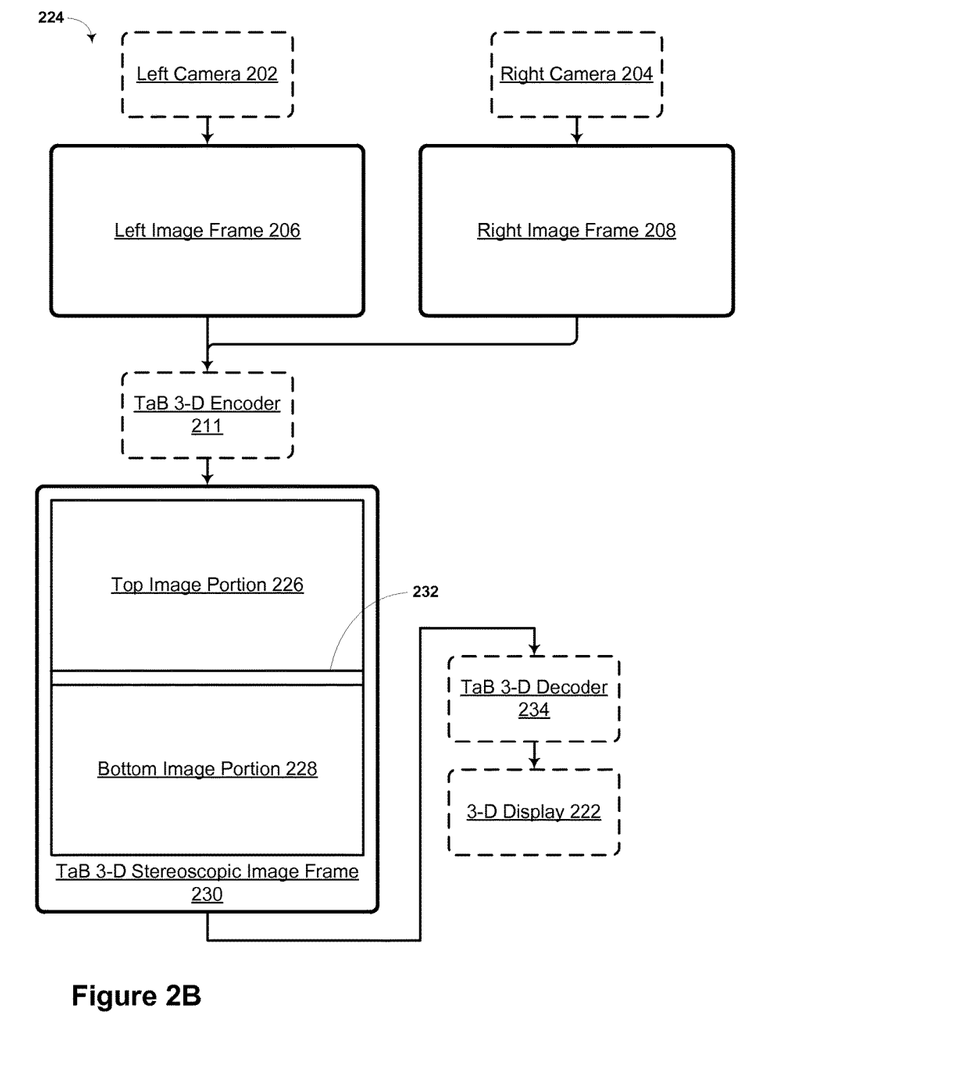
FIG. 2B illustrates the capture, encoding, decoding, and display of 3-D stereoscopic images encoded using a top and bottom file format, in accordance with an example embodiment.
Figure 2C:
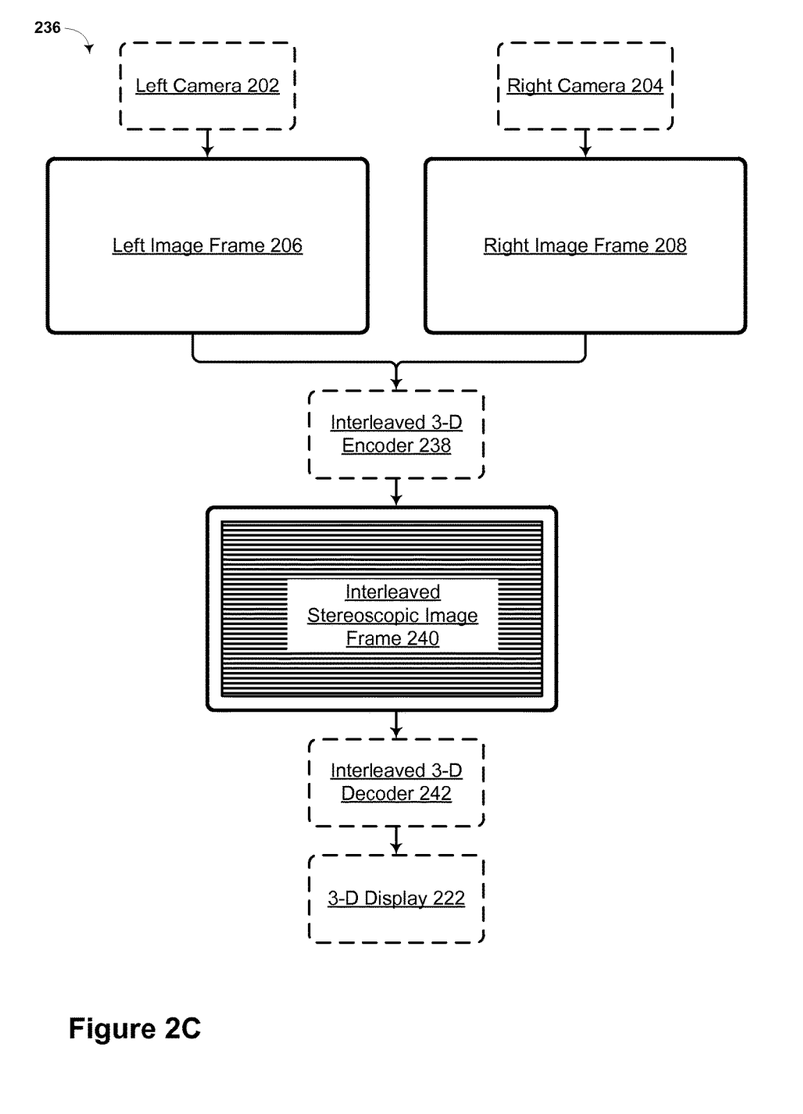
FIG. 2C illustrates the capture, encoding, decoding, and display of 3-D stereoscopic images encoded using an interlaced file format, in accordance with an example embodiment.

FIGS. 2A, 2B, and 2C illustrate how 3-D stereoscopic images can be captured, encoded, decoded and viewed in various formats. For example, in FIG. 2A, a left camera 202 and a right camera 204 may capture 2-D imagery in a stereoscopic setup such that left image frames 206 and right image frames 208 are simultaneously captured and synchronized. The left and right image frames (206 and 208) could be encoded in real-time or in post-processing using a side-by-side (SbS) 3-D encoder 210. As mentioned above, encoding could comply with a video compression standard, including an MPEG standard.

Once encoded, an individual image frame may appear as the SbS 3-D stereoscopic image frame 212 in FIG. 2A. The SbS 3-D stereoscopic image frame may include a left image portion 214 that may correspond to the raw captured video stream from left camera 202 and a right image portion 216 that may correspond to the raw captured video stream from right camera 204. Other features of the SbS 3-D stereoscopic image frame 212 are possible, specifically including an optional interstitial space 218 that could be white or black or another color. The optional interstitial space 218 may further be detected by the techniques cited below in order to determine an assumed frame format for similarity analysis.

An appropriate decoder, such as SbS 3-D decoder 220, could be used to decompress the video image file. Subsequently, the decoded image stream could be viewed using a 3-D display 222.

FIG. 2B illustrates an example of a top-and-bottom (TaB) 3-D stereoscopic format. A TaB 3-D encoder 211 generates video frames in a TaB format, in which the left and right images appear in the top and bottom portions of each frame. For example, FIG. 2B illustrates a TaB image frame 230 that includes a top image portion 226 and a bottom image portion 228. Top image portion 226 could correspond to left image frame 206 and bottom image portion 228 could correspond to right image frame 208, or vice versa. An appropriate decoder, such as TaB 3-D decoder 234, could be used to decompress the video image file to allow viewing on 3-D display 222. Other features of the TaB image frame 230 are possible, including an optional interstitial space 232 that could be white or black or another color. The optional interstitial space 232 may further be detected by the techniques cited below in order to determine an assumed frame format for similarity analysis.

FIG. 2C illustrates an example of an interleaved 3-D stereoscopic format. An interleaved 3-D encoder 238 generates video frames in an interleaved format, in which the left and frames take up alternate lines in each frame, as illustrated by interleaved stereoscopic frame 240. An appropriate decoder, such as Interleaved 3-D decoder 242, could be used to decompress the video image file to allow viewing on 3-D display 222.

Those skilled in the art will understand that there are a variety of apparatuses that could be used to determine if a video image file contains 3-D stereoscopic images. The aforementioned example embodiment is not intended to bar the use of any other such examples which could be reasonably applied within the context of this invention.

3. A Method for 3-D Video Detection

Figure 3:
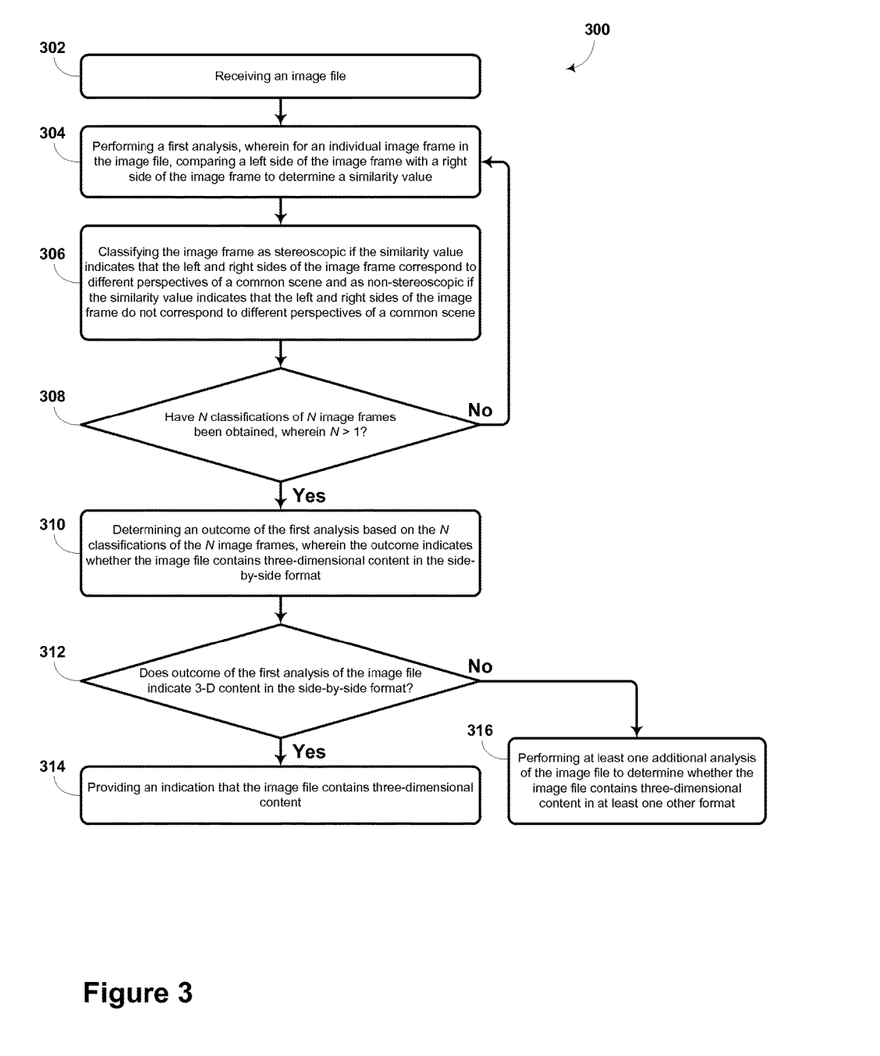
FIG. 3 is a flowchart of a method, in accordance with an example embodiment.

A method is provided for automatically detecting 3-D images in an image file. The method could be performed using a computing device and image file formats as illustrated FIGS. 1, 2A, 2B, and 2C and as described above, however, other configurations could be used. FIG. 3 illustrates the steps in an example method 300. It is understood that in other embodiments, the steps may appear in different order and steps may be added or subtracted. Further, the method 300 is specifically described with reference to FIGS. 1, 2A, 2B, and 2C. However, other example embodiments are possible within the context of the method 300.

Method step 302 includes receiving an image file. The image file could be formatted according to a particular standard, such as the aforementioned H.264/MPEG-4 AVC or pending H.265/HEVC standard. Other image file formats known in the art are possible. The image file may include video frames intended for 3-D viewing and could be similar to 3-D image file 150 as shown in FIG. 1. Alternatively, the image file could consist of all 2-D video frames. The computing device 100 could receive the image file from various sources including physical computer-readable media such as a flash memory or hard drive. Alternatively, the computing device 100 could receive the image file via a wireless communication interface 142 or a wired interface. In another embodiment, the computing device could be integrated with an image capture device and/or could receive the image file in a streaming fashion.

Method step 304 includes performing a first analysis, which includes comparing (for various individual image frames in the image file) a left side of the image frame with the right side of the image frame to determine a similarity value. In other words, the step assumes a priori that the image frame is formatted in a side-by-side format with stereo 2-D image streams positioned within the left and right portions of the image frame. Further, two comparison images could be extracted from the image frame and compared to one another.

Image comparison may take a variety of forms and could relate to one or a combination of different known techniques for image comparison. For instance, points of interest could be selected in each of the compared images and the points could be compared between the compared images. Large offsets in the position of points or differences in the number of interesting points may indicate little similarity between the two compared images. Other analysis algorithms, such as those mentioned above (e.g. panoramic and difference algorithms), may be reasonably implemented within the context of method step 304.

Each algorithm or combination of algorithms could generate a similarity value based on how similar the comparison images are determined to be.

Method step 306 includes classifying the image frame as stereoscopic if the two comparison frames are considered sufficiently similar (a determined similarity value above a certain threshold). Further, the image frame will be considered non-stereoscopic if the two comparison frames are considered insufficiently similar (a determined similarity value below a certain threshold). The exact threshold value for the determination of similar or not similar may depend upon various factors such as lighting of the comparison images, composition of the comparison images, and the context of the comparison images.

Method step 308 includes determining whether N classifications of N image frames have been obtained, where N>1. If fewer than N classifications have been obtained, the method may evaluate a different frame within the video image file. If N classifications have been obtained, the method may continue to step 310.

Method step 310 includes determining the outcome of the first analysis based on the N classifications. The outcome could be that the video image file contains content in the 3-D stereoscopic side-by-side format. If so, an indication could be provided in method step 314 to tell a cloud server or another resource that the video image file is stereoscopic 3-D with a side-by-side format. Indications could alternatively include embedding the video image file format into the video file metadata and/or sidecar file as described above.

If the outcome does not indicate 3-D stereoscopic video image content exists in the video image file, optional method step 316 provides performing at least one additional analysis of the image file using a different image format assumption in order to more completely determine whether the image file contains 3-D content. For example, after testing the side-by-side format, the video image file could be analyzed in a similar manner to determine whether it contains image content in a top-and-bottom or interleaved format.

4. 3-D Video Detection by a Server

Figure 4:
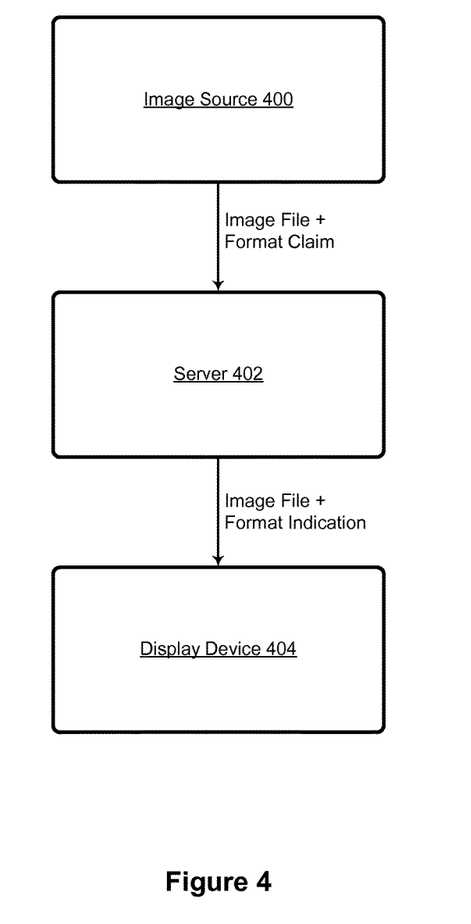
FIG. 4 illustrates a scenario involving an image source, a server, and a display device, in accordance with an example embodiment.

FIG. 4 illustrates a scenario involving an image source 400, a server 402, and a display device 404, as one possible application of method 300. Image source 400 could be any source of image content, such as a desktop computer, laptop computer, tablet computer, handheld computer, smartphone, or camcorder. Server 402 could be any computing device or cluster of computer devices that can communicate with other devices through a communications network, such as the Internet. In one example, server 402 is configured as computing device 100 illustrated in FIG. 1. The communications between server 402 and such other devices could involve the Hypertext Transfer Protocol (HTTP) or other communication protocol. Display device 404 could be any device that can display or is connected to a device that can display image content, such as a desktop computer, laptop computer, tablet computer, handheld computer, smartphone, set-top box, gaming console, monitor or television.

In the scenario illustrated in FIG. 4, image source 400 uploads an image file to server 402. The image file could be, for example, a video file. The image file from image source 400 includes or is accompanied by a format claim. The format claim may represent, in some fashion, that the image file contains 3-D content. The format claim may further represent that the 3-D content is in a particular format, such as a side-by-side format, a top-and-bottom format, or an interleaved format. The format claim could be part of the metadata of the image file. Alternatively, the format claim could be part of a separate description of the image file.

The server 402 may then analyze the image file to test the format claim, for example, as described above for method 300. In particular, server 402 may test whether the image file contains 3-D content in a first assumed format. The first assumed format could be based on any formatting information in the format claim. Alternatively, the first assumed format could be chosen as the side-by-side format (or some other format) by default. The analysis that server 402 performs on the image file results in a determination as to whether the image file contains 3-D content and, if so, in what format. Server 402 may then store the image file in association with the results of the 3-D content analysis.

Subsequently, server 402 transmits the image file to display device 404, for example, in response to a request from display device 404. The transmission could involve streaming or downloading the image file to display device 404. The transmission of the image file to display device 404 also includes a format indication that is based on the results of the 3-D content analysis performed by server 402. Thus, the format indication may indicate whether the image file contains 3-D content and, if so, in what format. The format indication could be conveyed in signaling used to set up the transmission of the image file from server 402 to display device 404. Alternatively, the format indication could be included in the image file as metadata, or provided to display device 404 in other ways.

Display device 404 may then render the image file based on the format indication provided by server 402. For example, if the format indication indicates a side-by-side format, display device 404 may employ a side-by-side 3-D decoder, and if the format indication indicates some other format (such as top-and-bottom or interleaved), display device 40 may employ a 3-D decoder that is appropriate for that other format. On the other hand, if the format indication indicates that the image file does not contain 3-D content, then display device 404 would not use any 3-D decoder. In this way, an image file may be properly decoded and displayed on a display device, even if the source of the image file incorrectly represents the format of the content.

5. A Non-Transitory Computer Readable Medium with Instructions for 3-D Video Detection Some or all of the functions described above and illustrated in FIGS. 2A, 2B, 2C, and 3 may be performed by a computing device in response to the execution of instructions stored in a non-transitory computer readable medium. The non-transitory computer readable medium could be, for example, a random access memory (RAM), a read-only memory (ROM), a flash memory, a cache memory, one or more magnetically encoded discs, one or more optically encoded discs, or any other form of non-transitory data storage. The non-transitory computer readable medium could also be distributed among multiple data storage elements, which could be remotely located from each other. The computing device that executes the stored instructions could be a device such as the computing device 100 illustrated in FIG. 1 and the non-transitory computer readable medium may correspond to the memory 114. Alternatively, the computing device that executes the stored instructions could be another computing device, such as a server in a server network.

The non-transitory computer readable medium (e.g. memory 114) may store instructions executable by the controller 112 to perform various functions. For instance, the functions may include reading metadata from a video image file, making a first assumption regarding the frame format of the video image file, and analyzing the video image frames in order to determine if comparison images within a single frame are sufficiently similar. If several frames are analyzed and found to be sufficiently similar, the video image file may be classified as stereoscopic 3-D type with a particular frame format. Further, the non-transitory computer readable medium could direct the controller 112 to notify a network server or other resource that the video image file is stereoscopic 3-D type with a particular frame format. Additionally or alternatively, the controller 112 could be directed to encode the video image file with the correct signifiers (e.g. in metadata) to reduce any uncertainty about the video image file type and format if encountered again in the future.

CONCLUSION

The above detailed description describes various features and functions of the disclosed systems, devices, and methods with reference to the accompanying figures. While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for determining whether an image file contains three-dimensional content, the method comprising:

receiving an image file that may contain two- or three-dimensional content;
determining whether the image file has characteristics consistent with the image file containing three-dimensional content by analyzing data compression efficiency of the image file, wherein analyzing the data compression efficiency of the image file includes:
identifying a data compression technique used to compress the image file;
determining a data compression ratio achieved by the data compression technique when compressing the image file;
comparing the data compression ratio to a threshold;
determining that the image file has characteristics consistent with the image file containing three-dimensional content responsive to determining that the data compression ratio is greater than the threshold;
responsive to determining that the data comparison ratio is less than the threshold, generating a panoramic imaged based on the image file; and
determining whether the image file has characteristics consistent with the image file containing three-dimensional content based on the panoramic image; and
in response to determining that the image file has characteristics consistent with the image file containing three-dimensional content, providing an indication that the image file contains three-dimensional content to a display device that is to display the three-dimensional content.

2. The method of claim 1, wherein the image file is a video file.

3. The method of claim 1, further comprising:
receiving a representation that the image file contains three-dimensional content.

4. The method of claim 3, wherein the representation indicates the image file contains three-dimensional content in a side-by-side format.

5. The method of claim 1, analyzing the image file to determine whether the image file has characteristics consistent with the image file containing three-dimensional content further comprises:
identifying a pair of comparison images derived from an image frame in the image file;
attempting to overlay the pair of comparison images to produce a panoramic image; and
determining that the image file has characteristics consistent with the image file containing three-dimensional content responsive to a successful attempt to overlay the pair of comparison images to produce the panoramic image.

6. The method of claim 1, wherein analyzing the image file to determine whether the image file has characteristics consistent with the image file containing three-dimensional content further comprises:
identifying a pair of comparison images derived from an image frame in the image file;
generating a similarity value responsive to a comparison of the images in the pair;
comparing the similarity value to a second threshold; and
determining that the image file has characteristics consistent with the image file containing three-dimensional content responsive to the comparison of the similarity value to the second threshold.

7. The method of claim 6, wherein generating the similarity value responsive to the comparison of the images in the pair comprises:

creating a difference image describing differences between the images in the pair; and
generating the similarity value responsive to the difference image.

8. The method of claim 1, further comprising:
responsive to a determination that the image file does not have characteristics consistent with the image file containing three-dimensional content, providing an indication that the image file contains two-dimensional content.

9. The method of claim 8, providing an indication that the image file contains two-dimensional content comprises:
updating a description of the image file on a server to provide an updated description that indicates that the image file contains two-dimensional content.

10. The method of claim 8, wherein providing an indication that the image file contains two-dimensional content comprises:
adding metadata to the image file, wherein the metadata indicates that the image file contains two-dimensional content.

11. A computing device, comprising:
a processor; and
a non-transitory data storage storing program instructions executable by the processor to perform functions comprising:
receiving an image file that may contain two- or three-dimensional content;
determining whether the image file has characteristics consistent with the image file containing three-dimensional content by analyzing data compression efficiency of the image file, wherein analyzing the data compression efficiency includes:
identifying a data compression technique used to compress the image file;
determining a data compression ratio achieved by the data compression technique when compressing the image file; comparing the data compression ratio to a threshold;
determining that the image file has characteristics consistent with the image file containing three-dimensional content responsive to determining that the data compression ratio is greater than the threshold;
responsive to determining that the data comparison ratio is less than the threshold, generating a panoramic imaged based on the image file; and
determining whether the image file has characteristics consistent with the image file containing three-dimensional content based on the panoramic image; and
in response to determining that the image file has characteristics consistent with the image file containing three-dimensional content, providing an indication that the image file contains three-dimensional content to a display device that is to display the three-dimensional content.

12. The computing device of claim 11, providing an indication that the image file contains three-dimensional content further comprises:
uploading a description of the image file to a server, wherein the description indicates that the image file contains three-dimensional content.

13. The computing device of claim 11, wherein providing an indication that the image file contains three-dimensional content further comprises:

adding metadata to the image file, wherein the metadata indicates that the image file contains three-dimensional content.

14. The computing device of claim 11, further comprising:
responsive to a determination that the image file does not have characteristics consistent with the image file containing three-dimensional content, providing an indication that the image file contains two-dimensional content.

15. A non-transitory computer readable medium having stored therein instructions executable by a computing device to cause the computing device to perform functions, the functions comprising:
receiving an image file that may contain two- or three-dimensional content;
determining whether the image file has characteristics consistent with the image file containing three-dimensional content by analyzing data compression efficiency of the image file, wherein analyzing the data compression efficiency includes:
identifying a data compression technique used to compress the image file;
determining a data compression ratio achieved by the data compression technique when compressing the image file;
comparing the data compression ratio to a threshold;
determining that the image file has characteristics consistent with the image file containing three-dimensional content responsive to determining that the data compression ratio is greater than the threshold;
responsive to determining that the data comparison ratio is less than the threshold, generating a panoramic imaged based on the image file; and
determining whether the image file has characteristics consistent with the image file containing three-dimensional content based on the panoramic image; and
in response to determining that the image file has characteristics consistent with the image file containing three-dimensional content, providing an indication that the image file contains three dimensional content to a display device that is to display the three-dimensional content.

16. The computer readable medium of claim 15, wherein providing an indication that the image file contains three-dimensional content further comprises:
uploading a description of the image file to a server, wherein the description indicates that the image file contains three-dimensional content.

17. The computer readable medium of claim 15, wherein providing an indication that the image file contains three-dimensional content further comprises:
adding metadata to the image file, wherein the metadata indicates that the image file contains three-dimensional content.

* * * * *